United States Patent
Liu

(10) Patent No.: US 10,561,173 B2
(45) Date of Patent: Feb. 18, 2020

(54) ELECTRONIC CIGARETTE CASE WITH MAGNETIC ATTRACTION TYPE CHARGING FUNCTION AND ELECTRONIC CIGARETTE THEREWITH

(71) Applicant: SHENZHEN BUDDY TECHNOLOGY DEVELOPMENT CO., LTD., Fuyong Town Bao'an District, Shenzhen (CN)

(72) Inventor: Xiang Liu, Shenzhen (CN)

(73) Assignee: SHENZHEN BUDDY TECHNOLOGY DEVELOPMENT CO., LTD., Shenzhen, Guangdong (CN)

( * ) Notice: Subject to any disclaimer, the term of this patent is extended or adjusted under 35 U.S.C. 154(b) by 580 days.

(21) Appl. No.: 15/127,403

(22) PCT Filed: Apr. 30, 2014

(86) PCT No.: PCT/CN2014/076574
§ 371 (c)(1),
(2) Date: Sep. 19, 2016

(87) PCT Pub. No.: WO2015/139358
PCT Pub. Date: Sep. 24, 2015

(65) Prior Publication Data
US 2017/0027221 A1    Feb. 2, 2017

(30) Foreign Application Priority Data

Mar. 18, 2014 (CN) .......................... 2014 1 0097936

(51) Int. Cl.
*A24F 15/18* (2006.01)
*H02J 7/00* (2006.01)
(Continued)

(52) U.S. Cl.
CPC .............. *A24F 15/18* (2013.01); *A24F 15/20* (2013.01); *A24F 47/008* (2013.01); *B65D 43/16* (2013.01);
(Continued)

(58) Field of Classification Search
None
See application file for complete search history.

(56) References Cited

U.S. PATENT DOCUMENTS 2,419,889 A * 4/1947 Florman ................... F23Q 2/06
                                                                    431/134
2013/0169230 A1* 7/2013 Li ......................... H02J 7/0044
                                                                    320/114

FOREIGN PATENT DOCUMENTS

CN        202474905        10/2012
CN        203182016         9/2013
(Continued)

*Primary Examiner* — Phu H Nguyen
(74) *Attorney, Agent, or Firm* — Raymond Y. Chan; David and Raymond Patent Firm

(57) ABSTRACT

An electronic cigarette case with magnetic attraction type charging function and an electronic cigarette therewith have the advantages of good user experience in charging, stable and reliable charging connections, convenience and quickness in use and a simple structure. The electronic cigarette case comprises a charging base body, a copper sheet arranged between an annular magnet and a magnetic attraction type charging base in a case body, an insulating ejector pin base inserted into the annular magnet, and an elastic charging ejector pin inserted into the insulating ejector pin base. An electronic cigarette includes an atomizer assembly and a battery rod assembly provided with a magnetic attraction type charging assembly including an annular iron piece. A power supply ejector pin, an annular iron piece and an
(Continued)

electronic cigarette battery are respectively connected with an electronic cigarette microphone of the electronic cigarette.

3 Claims, 16 Drawing Sheets

(51) Int. Cl.
  *A24F 47/00*   (2006.01)
  *A24F 15/20*   (2006.01)
  *B65D 43/16*   (2006.01)
  *B65D 85/00*   (2006.01)
  *H05B 3/12*   (2006.01)

(52) U.S. Cl.
  CPC ............ *B65D 85/70* (2013.01); *H02J 7/0044* (2013.01); *H05B 3/12* (2013.01); *H05B 2203/021* (2013.01)

(56) References Cited

FOREIGN PATENT DOCUMENTS

| | | |
|---|---|---|
| CN | 203424299 | 2/2014 |
| CN | 203814590 | 9/2014 |
| WO | WO2008139441 A2 | 11/2008 |

* cited by examiner

ELECTRONIC CIGARETTE CASE WITH MAGNETIC ATTRACTION TYPE CHARGING FUNCTION AND ELECTRONIC CIGARETTE THEREWITH

CROSS REFERENCE OF RELATED APPLICATION

This is a U.S. National Stage under 35 U.S.C. 371 of the International Application Number PCT/CN2014/076574, filed Apr. 30, 2014, which claims priority under 35 U.S.C. 119(a-d) to Chinese application number 201410097936.0, filed Mar. 18, 2014. The afore-mentioned patent applications are hereby incorporated by reference in their entireties.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an electronic cigarette and more particularly to an electronic cigarette case with magnetic attraction type charging function and electronic cigarette therewith.

Description of Related Arts

Electronic cigarette is a common electronic product which is used for quitting smoking or is used to be a substitute of a real traditional cigarette. As the electronic cigarette has a similar appearance and taste with a traditional cigarette, while the electronic cigarette does not contain harmful ingredients such as tar, the electronic cigarette has been widely used in the market. At present, a conventional electronic cigarette generally includes an atomizer component and a battery component, and that the atomizer component is connected with the battery component with a rotary thread connection. When the conventional electronic cigarette is required to charge, the atomizer component and the battery component have to be separated to charge the battery component. As a result, the charging of the conventional electronic cigarette is inconvenient. In addition, although there is a conventional electronic cigarette case to match with the conventional electronic cigarette, the conventional electronic cigarette case generally can only be used to receive the atomizer component and the battery component of the electronic cigarette. The atomizer component and the battery component is not able to charge the conventional electronic cigarette. The conventional electronic cigarette is generally charged by an external charger, which seriously affects a charging experience of the conventional electronic cigarette.

SUMMARY OF THE PRESENT INVENTION

The invention is advantageous in that it provides an electronic cigarette case with magnetic attraction type charging function and electronic cigarette therewith, wherein the electronic cigarette case and the electronic cigarette have the advantages of good user experience in charging, stable and reliable charging connections, convenience and quickness in use, and a simple structure.

Additional advantages and features of the invention will become apparent from the description which follows, and may be realized by means of the instrumentalities and combinations particular point out in the appended claims.

According to the present invention, the foregoing and other objects and advantages are attained by an electronic cigarette case with a magnetic attraction type charging function, comprising:

a case body provided with at least one jack, and a case cover, wherein the case body comprises a circuit assembly, a cigarette battery and a magnetic attraction type charging base which comprises a charging base body disposed inside the case body, wherein the charging base body is provided with a splicing inner hole aligned with the jack, wherein an annular magnet is provided in the splicing inner hole and a copper sheet having an inner hole is inserted into the splicing inner hole of the magnetic attraction type charging base, wherein the copper sheet is arranged on outside of the annular magnet and an insulating ejector pin base is inserted into the annular magnet, wherein an elastic charging ejector pin is inserted into the insulating ejector pin base, and the elastic charging ejector pin, the copper sheet and the cigarette battery are respectively connected with the circuit assembly.

In some embodiments, an outer wall of the charging base body is provided with a sliding slot which is arranged parallel to an axial direction of the charging base body, and one side of the copper sheet is provided with a positioning element which is slidably provided in the sliding slot.

In some embodiments, the case cover is provided with two parallel connecting panels and a spring base is provided on the case body. The spring base is provided with a metal sheet which is provided with a rotate resetting spring. An upper portion of the metal sheet is movable connected to the two connecting panels by a connecting shaft. One end portion of the rotate resetting spring is abutted against lower end portions of the two connecting panels and other end portion of the rotate resetting spring is abutted against an upper end portion of the spring base. An outside of the metal sheet is provided with a rotate positioning groove cooperated with a rotating axle to achieve a reversal positioning. The rotating axle is provided on the connecting panels and is disposed on an upper side of the connecting shaft. One end portion of the rotating axle is provided with an axle cap, and the rotating axle penetrates through the two connecting panels in sequence and is fixed to the connecting panels by a screw.

In some embodiments, a vibrating piece is provided in the case cover, wherein one end of the vibrating piece is connected with an inner wall of the case cover by a connector. The vibrating piece is provided with a sound hammer and the sound hammer is provided on a side which is the vibrating piece facing to the inner wall of the case cover, and the sound hammer is spaced with the inner wall of the case cover.

In some embodiments, a top portion of the case body is provided with a positioning convex platform, and when the case cover is closed to the case body, the case cover is positioned on the positioning convex platform of the case body.

In some embodiments, the case body comprises a middle metal shell and an inner cover. The circuit assembly, the cigarette battery and the magnetic attraction type charging base are provided in the middle metal shell. A top portion of the middle metal shell is provided with the jack. A rear panel is provided in a surface of the middle metal shell. A front panel is provided on a surface of the inner cover and the inner cover is provided with a perspective hole. The circuit assembly is provided a liquid crystal display abutted against an edge of the perspective hole by a foam. The front panel is corresponded to a perspective window of the perspective hole. Two case cover panels are respectively provided on two sides of the case cover, and the case cover panels, the rear panel and the front panel are made of materials selected from the group consisting of acrylic and leather.

In accordance with another aspect of the invention, the foregoing and other objects and advantages are also attained by an electronic cigarette with a magnetic attraction type charging function, comprising:

an atomizer assembly, and a battery rod assembly comprising:

a battery tube, which is internally installed an electronic cigarette battery, having one end provided with an atomizer connector and another end provided with a microphone module comprising a light transmitting microphone base and an electronic cigarette microphone provided in the light transmitting microphone base, wherein an outer side of the light transmitting microphone base is provided with a magnetic attraction type charging assembly which comprises an annular iron piece, wherein a light transmitting isolation piece is inserted into the annular iron piece and a power supply ejector pin is inserted into the light transmitting isolation piece, and that the power supply ejector pin, the annular iron piece and the electronic cigarette battery are respectively connected to the electronic cigarette microphone.

In some embodiments, the atomizer assembly comprises an atomizing tube built-in an oil bullet. One end of the atomizing tube is provided with a cigarette holder and the other end of the atomizing tube is provided with a battery rod connector which comprises a metal screw rod and an atomizer thimble. An anti-oil-leakage insulated isolation element is provided between the metal screw rod and the atomizer thimble. A ceramic base is provided in the metal screw rod and a sealing loop is provided between the metal screw rod and the atomizing tube. An opening of the oil bullet is sealed with a filter cotton. An oil guiding rope is clamped and fastened between the metal screw rod and the ceramic base. The oil guiding rope is surrounded with a heating wire. The metal screw rod and the atomizer thimble are respectively connected with the heating wire. The atomizer connector comprises a metal thread sleeve which is inserted into the battery tube and an elastic battery thimble. A thimble insulated isolation element is provided between the metal thread sleeve and the elastic battery thimble. The metal thread sleeve and the metal screw rod are electrically connected by threaded fit, and the elastic battery thimble and the atomizer thimble are electrically connected by contacting to each other.

In some embodiments, an outer wall of the anti-oil-leakage insulated isolation element is provided with a mounting groove and the anti-oil-leakage insulated isolation element is inserted and positioned into the metal screw rod by the mounting groove. An oil isolation film is provided on the anti-oil-leakage insulated isolation element and is located on a side of the venthole, and that a plurality of ventilate oil isolation slits is radially and centrosymmetric arranged on the oil isolation film.

In some embodiments, the atomizer thimble is provided with a first inner hole and an outer wall of the gap teeth is provided with gap teeth. An outer wall of the metal thread sleeve is provided with a gas guiding groove and a first overall air inlet. The power supply ejector pin is provided with a second overall air inlet. An inner chamber of the ceramic base is communicated with the second overall air inlet sequentially by the first inner hole, the gap teeth, the gas guiding groove, a first gap which is provided between the battery tube and the electronic cigarette battery, and the microphone module. An inner chamber of the ceramic base is communicated with the cigarette holder sequentially by a second gap which is provided between the ceramic base and the oil bullet and a third gap which is provided between the oil bullet and the atomizing tube.

In some embodiments, the heating wire is a titanium alloy heating wire.

The electronic cigarette case with magnetic attraction type charging function of the present invention has the above advantages. A circuit assembly, a cigarette battery and a magnetic attraction type charging base are disposed inside the case body. The magnetic attraction type charging base comprises a charging base body, and the charging base body is provided with a splicing inner hole aligned with a jacks. An annular magnet is provided in the splicing inner hole and a copper sheet having an inner hole is inserted into the splicing inner hole of the magnetic attraction type charging base. The copper sheet is arranged on outside of the annular magnet and an insulating ejector pin base is inserted into the annular magnet. An elastic charging ejector pin is inserted into the insulating ejector pin base. The elastic charging ejector pin, the copper sheet and the cigarette battery are respectively connected with the circuit assembly. The electronic cigarette case can be used as a portable mobile power supply of an electronic cigarette which has iron elements inside and which is arranged inside the jack, and the electronic cigarette case is capable of being adsorbing connected to the electronic cigarette by the annular magnet, so that the elastic charging ejector pin and the copper sheet are respectively and electrically connected to a charging motor of the electronic cigarette by magnetic attraction force. As the copper sheet are arranged on outside of the annular magnet, a size and structure of the annular magnet will not affect the copper sheet, thereby ensuring the copper sheet having a larger electrical contacting area. Furthermore, the larger electrical contacting area of the copper sheet and an elastic contacting of the elastic charging ejector pin are able to ensure that the magnetic attraction type charging base and charging electrodes of the electronic cigarette have a stable electrical connection. The electronic cigarette can be charged when the electronic cigarette is directly inserted into the jack, and the electronic cigarette will not be charged when the electronic cigarette is taken out side of the jack. The electronic cigarette case and the electronic cigarette have the advantages of stable and reliable charging connections, convenience and quickness in use and a simple structure.

The electronic cigarette with magnetic attraction type charging function of the present invention has the above advantages. The electronic cigarette with magnetic attraction type charging function is assorted with the electronic cigarette case with magnetic attraction type charging function of the present invention. As an outer side of the light transmitting microphone base is provided with a magnetic attraction type charging assembly, the magnetic attraction type charging assembly comprises an annular iron piece. A light transmitting isolation piece is inserted into the annular iron piece and a power supply ejector pin is inserted into the light transmitting isolation piece. The power supply ejector pin, the annular iron piece and the electronic cigarette battery are respectively connected to the electronic cigarette microphone. Thus when the electronic cigarette is not in use and if the electronic cigarette is out of power, the atomizer assembly and the battery rod assembly cannot be detached. The electronic cigarette is just needed to be inserted into the electronic cigarette case and the magnetic attraction type charging assembly is electrically contacted to the electrodes of the electronic cigarette case so as to be convenient to use. Furthermore, as the magnetic attraction type charging assembly comprises the annular iron piece, and the light transmitting isolation piece is inserted into the annular iron piece and the power supply ejector pin is inserted into the light transmitting isolation piece and the power supply ejector pin, the annular iron piece and the electronic cigarette battery are respectively connected to the electronic cigarette microphone. The annular iron piece is an electrode and also is a magnetic attraction member, which greatly simplifies the structure of the magnetic attraction type charging assembly and ensures that the annular iron piece has a larger contacting area to enhance the stability of electrical connections. Moreover, the light transmitting isolation piece is inserted into the annular iron piece, so that under a condition that the electronic cigarette microphone is pervious to light, firmly and stable connections of the electrodes of the electronic cigarette case are ensured and the electronic cigarette case has the advantages of stable and reliable charging connections, convenience and quickness in use and a simple structure.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
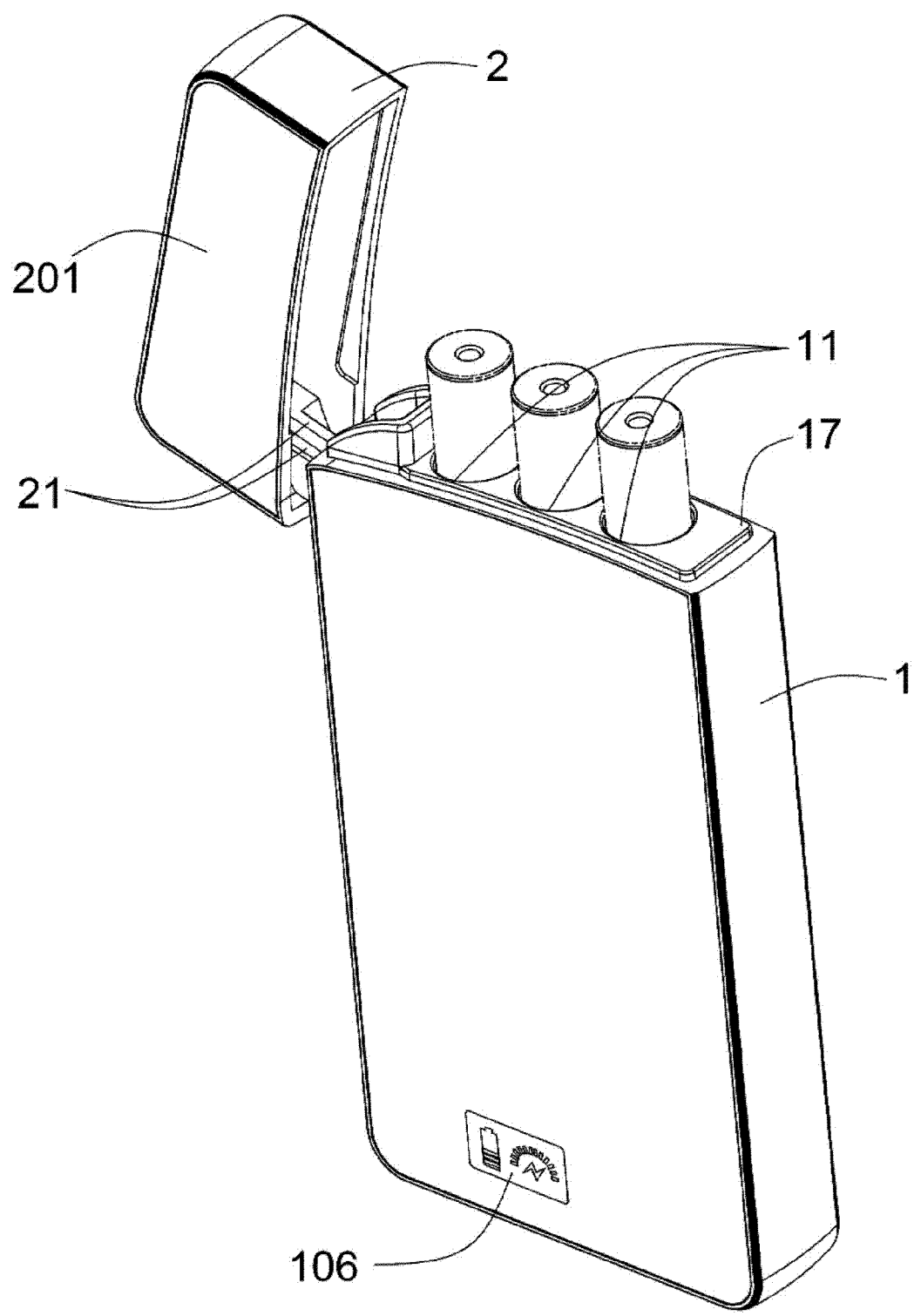
FIG. 1 is a perspective view of an electronic cigarette case according to an embodiment of the present invention when a case cover of the electronic cigarette case is opened.
Figure 2:
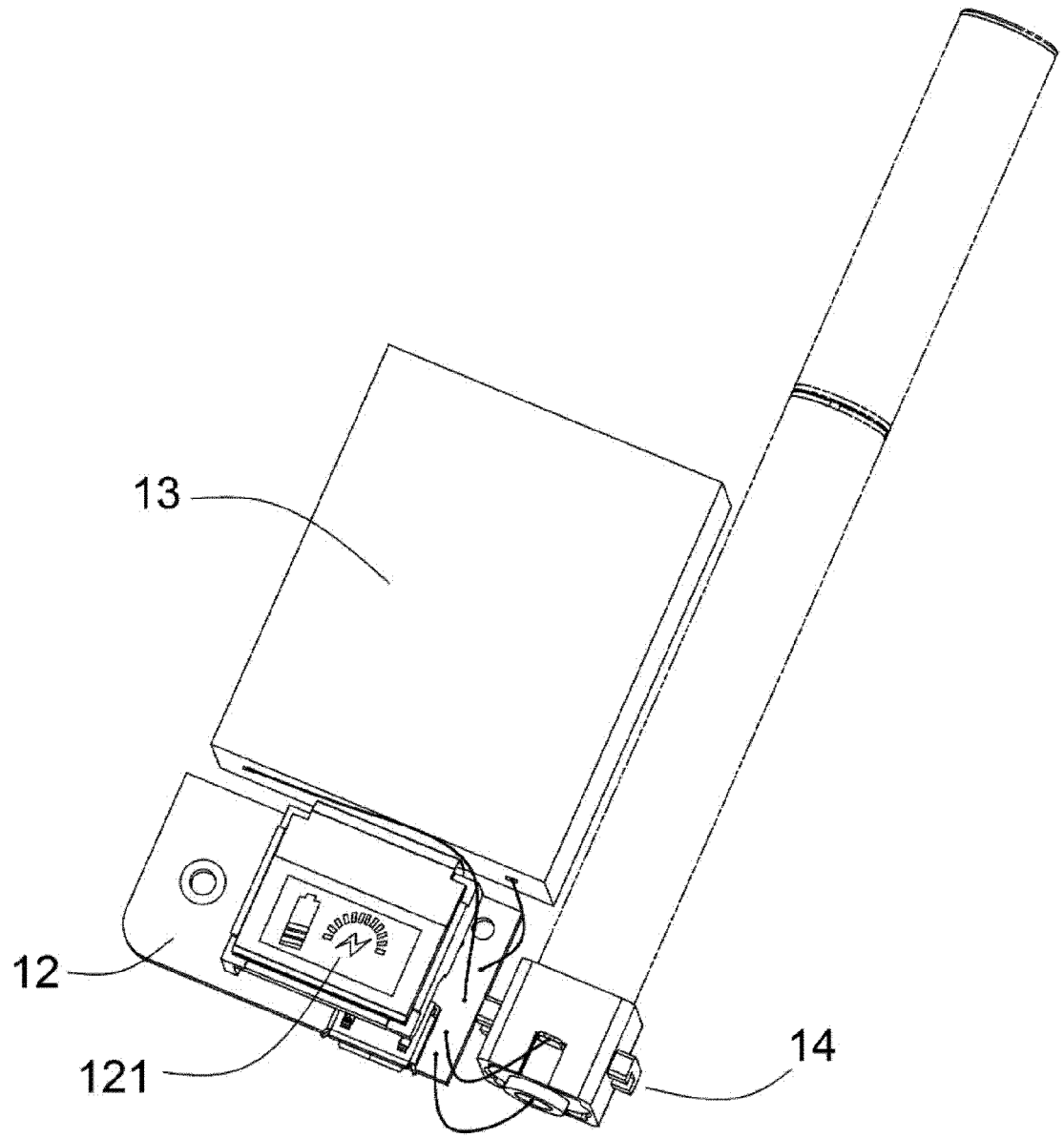
FIG. 2 is a perspective view of an internal structure of the electronic cigarette case relative to a charging function according to the embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 4 of the drawings, according to an embodiment of the present invention, an electronic cigarette case with a magnetic attraction type charging function is illustrated, wherein the electronic cigarette with a magnetic attraction type charging function comprises a case body 1 and a case cover 2. One or more jacks 11 are provided on the case body 1 and a circuit assembly 12, a cigarette battery 13 and a magnetic attraction type charging base 14 are disposed inside the case body 1. The magnetic attraction type charging base 14 comprises a charging base body 141, wherein the charging base body 141 is provided with a splicing inner hole 142 aligned with the jacks 11. An annular magnet 143 is provided in the splicing inner hole 142 and a metal made sheet like element such as copper sheet 144, having an inner hole, is inserted into the splicing inner hole 142 of the magnetic attraction type charging base 14. The copper sheet 144 is arranged on outside of the annular magnet 143 and an insulating ejector pin base 145 is inserted into the annular magnet 143. An elastic charging ejector pin 146 is inserted into the insulating ejector pin base 145. The elastic charging ejector pin 146, the copper sheet 144 and the cigarette battery 13 are respectively connected with the circuit assembly 12. The electronic cigarette case according to the embodiment of the present invention can be used as a portable mobile power supply of an electronic cigarette which has iron elements inside and is arranged inside the jacks 11. The electronic cigarette case is capable of being adsorbing connected to the electronic cigarette by the annular magnet 143, so that the elastic charging ejector pin 146 and the copper sheet 144 are respectively and electrically connected to a charging motor of the electronic cigarette by magnetic attraction force. As the copper sheet 144 are arranged on outside of the annular magnet 143, a size and structure of the annular magnet 143 will not affect the copper sheet 144, thereby ensuring the copper sheet 144 having a larger electrical contacting area. Furthermore, the larger electrical contacting area of the copper sheet 144 and an elastic contacting of the elastic charging ejector pin 146 are able to ensure that the magnetic attraction type charging base 14 and charging electrodes of the electronic cigarette have a stable electrical connection. The electronic cigarette can be charged when the electronic cigarette is directly inserted into the jack jacks 11, and the electronic cigarette will not be charged when the electronic cigarette is taken out side of the jacks 11. The electronic cigarette case and the electronic cigarette have the advantages of stable and reliable charging connections, convenience and quickness in use and a simple structure.

Figure 3:
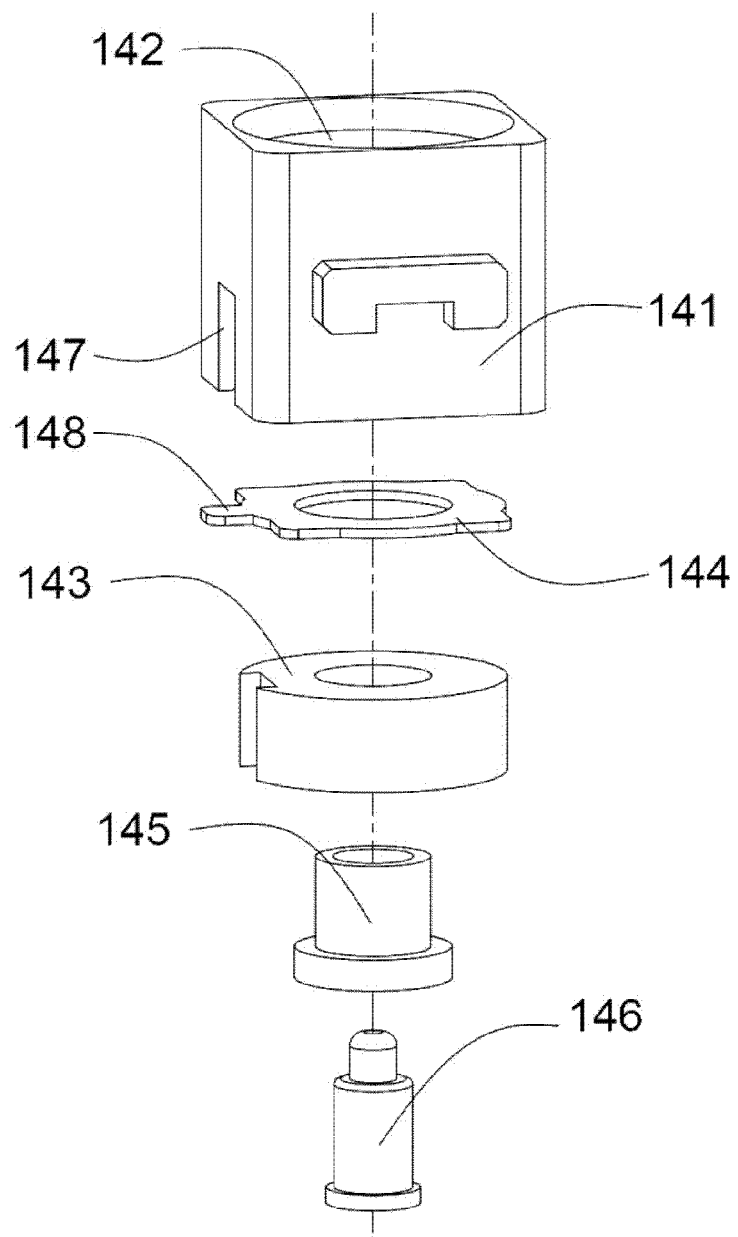
FIG. 3 is an exploded perspective view of a magnetic attraction type charging base of the electronic cigarette case according to the embodiment of the present invention.
Figure 4:
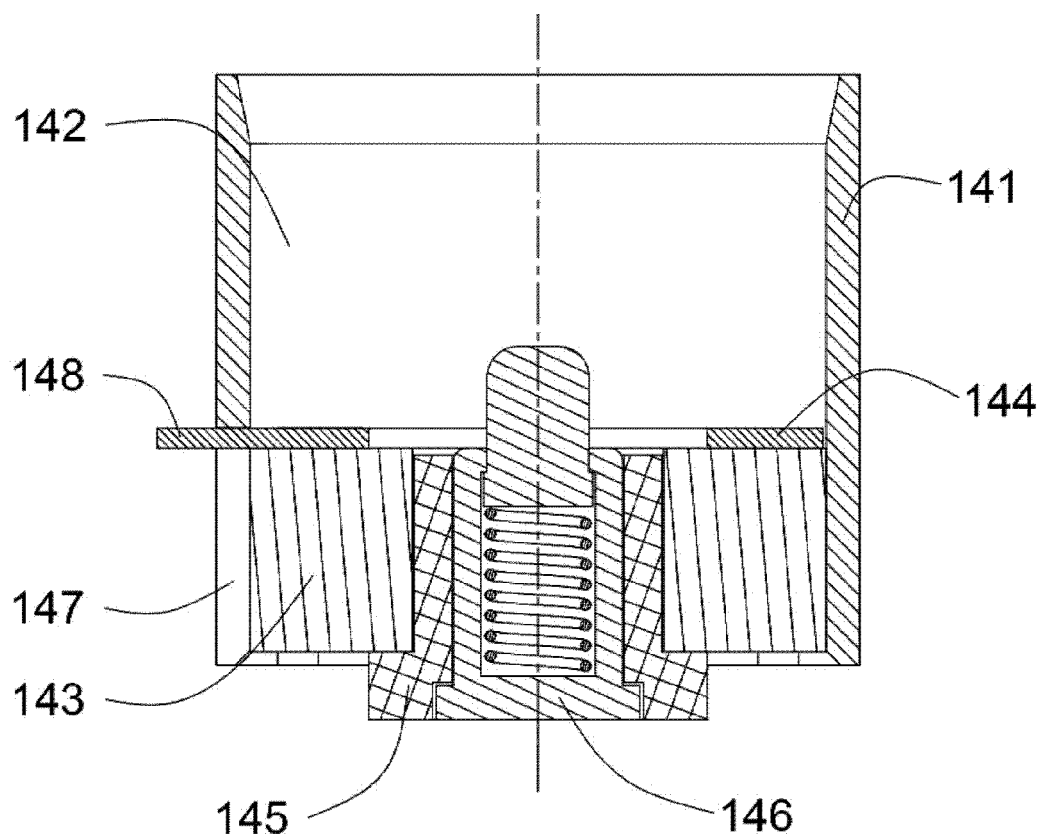
FIG. 4 is an enlarged cross-sectional view of the magnetic attraction type charging base of the electronic cigarette case according to the embodiment of the present invention.

As shown in FIG. 3 and FIG. 4 of the drawings, an outer wall of the charging base body 141 is provide with a sliding slot 147. The sliding slot 147 is arranged parallel to an axial direction of the charging base body 141. One side of the copper sheet 144 is provided with a positioning strip 148 which is slidably provided in the sliding slot 147. According to the embodiment of the present invention, the copper sheet 144 is inserted into the splicing inner hole 142 by above structure and the copper sheet 144 is ensured to have a predetermined sliding displacement in the sliding slot 147 to adapt to an elastic moving displacement of the elastic charging ejector pin 146. Furthermore, the copper sheet 144 is firmly fixed to the charging base body 141 and is not easily deformed and rotated, so that the electronic cigarette has a stable and reliable connection with the copper sheet 144 when the electronic cigarette is inserted into the jacks 11.

Figure 5:
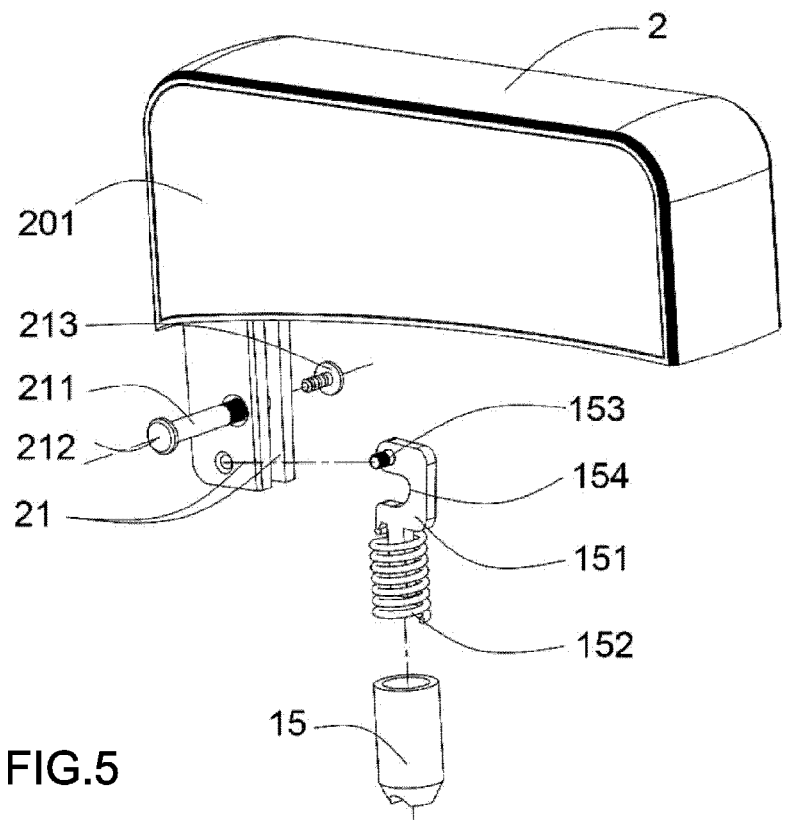
FIG. 5 is an exploded perspective view of a connection structure of a case body and the case cover of the electronic cigarette case according to the embodiment of the present invention.
Figure 6:
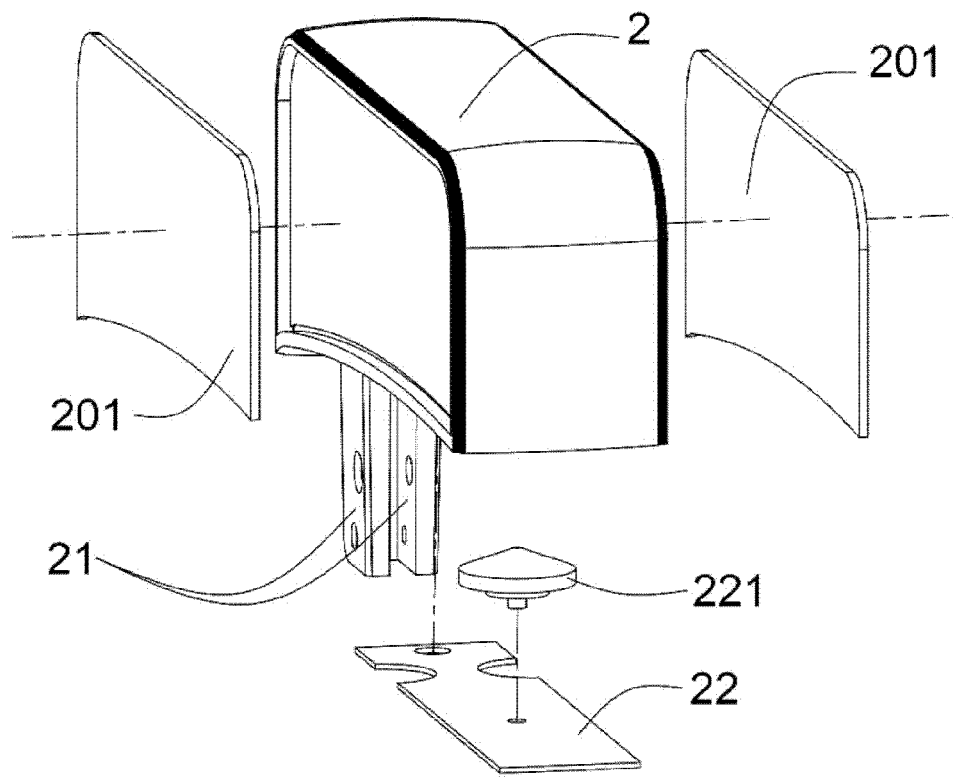
FIG. 6 is an exploded perspective view of the case cover of the electronic cigarette case according to the embodiment of the present invention.

As shown in FIG. 5 and FIG. 6 of the drawings, two connecting panels 21 are parallel provided on the case cover 2 and a spring base 15 is provided on the case body 1. The spring base 15 is provided with a metal sheet 151 and the metal sheet 151 is provided with a rotate resetting spring 152. An upper portion of the metal sheet 151 is movable connected to the two connecting panels 21 by a connecting shaft 153. One end portion of the rotate resetting spring 152 is abutted against lower end portions of the two connecting panels 21, and other end portion of the rotate resetting spring 152 is abutted against an upper end portion of the spring base 15. An outside of the metal sheet 151 is provided with a rotate positioning groove 154. A rotating axle 211 cooperating with the rotate positioning groove 154 to achieve a reversal positioning is provided on the connecting panels 21 and is disposed on an upper side of the connecting shaft 153. One end portion of the rotating axle 211 is provided with an axle cap 212, and the rotating axle 211 penetrates through the two connecting panels 21 in sequence and is fixed to the connecting panels 21 by a screw 213. According to the embodiment of the present invention, the case body 1 and the case cover 2 are movable connected by the metal sheet 151 and the two connecting panels 21. Furthermore, the rotation capability of the rotate resetting spring 152 ensures that a stable mechanical resistance is applied on the case cover 2 during a rotating process, and a loose problem of the case body 1 and the case cover 2 during being opened process and being closed process is effectively eliminated. Thus, the case cover 2 is capable of being reversal positioning through the rotating axle 211 and the rotate positioning groove 154.

As shown in FIG. 6 of the drawings, a vibrating piece 22 is provided in the case cover 2. One end of the vibrating piece 22 is connected with an inner wall of the case cover 2 by a connector. The vibrating piece 22 is provided with a sound hammer 221 and the sound hammer 221 is provided on a side which is the vibrating piece 22 facing to the inner wall of the case cover 2. A gap is provided between the sound hammer 221 and the inner wall of the case cover 2. When the case cover 2 is opened, the sound hammer 221 is knocked on the inner wall of the case cover 2 because of an inertia effect of the case cover 2 and the vibrating piece 22 is vibrated to produce a crisp sound in such a manner that an opening state of the case cover 2 is more appreciable to users and interestingness and peculiarity of the present invention are enhanced. Furthermore, according to the embodiment of the present invention, when the case cover 2 is closed, the vibrating piece 22 is firmly pressed on electronic cigarette inserted in the jacks 11 and the atomizer assembly 3. It is not only to prevent the electronic cigarette and the atomizer assembly 3 from waggling, but also a stable electrical connection of the electronic cigarette and the magnetic attraction type charging base 14 is ensured.

Figure 7:
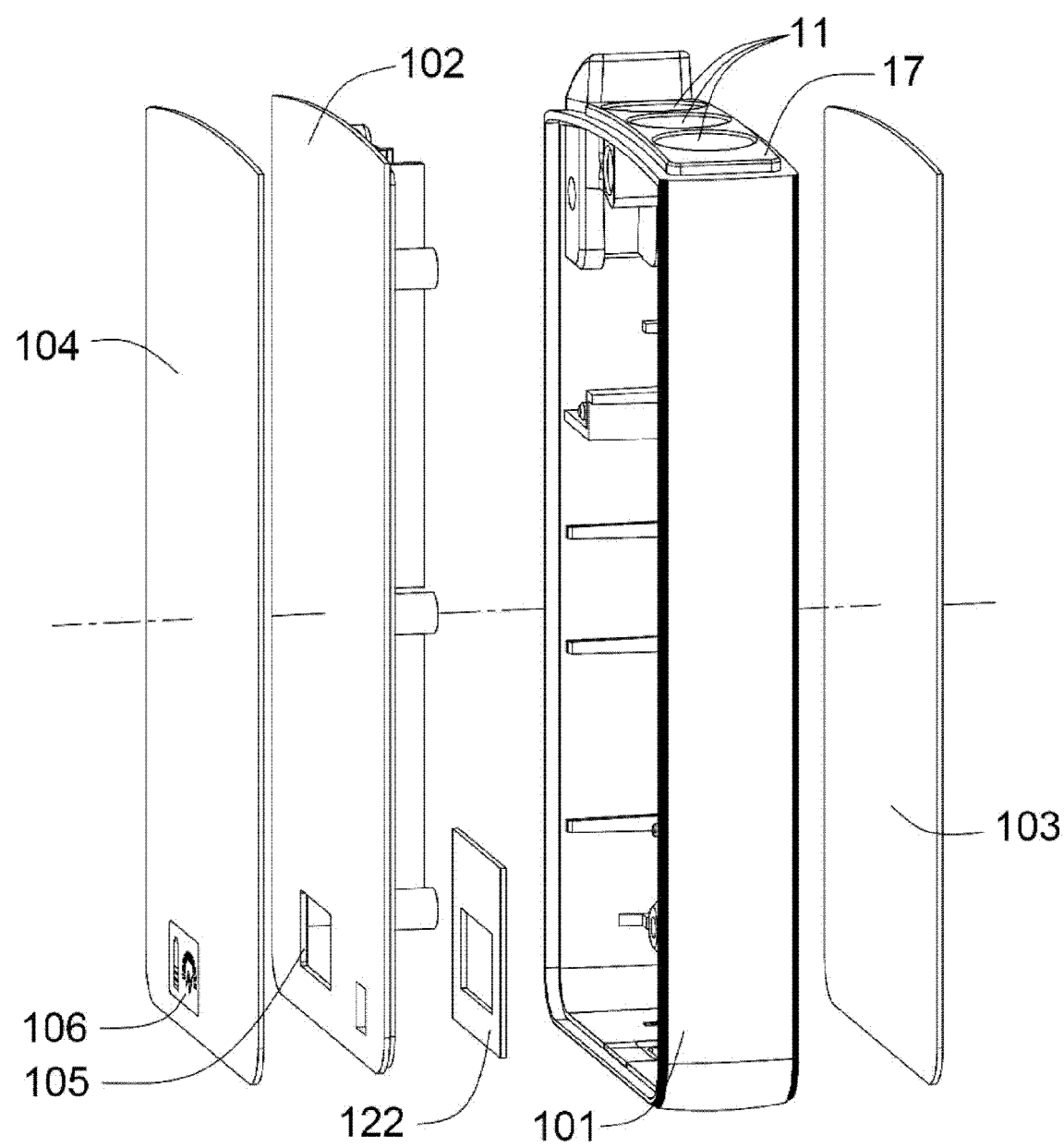
FIG. 7 is an exploded perspective view of the case body of the electronic cigarette case according to the embodiment of the present invention.
Figure 8:
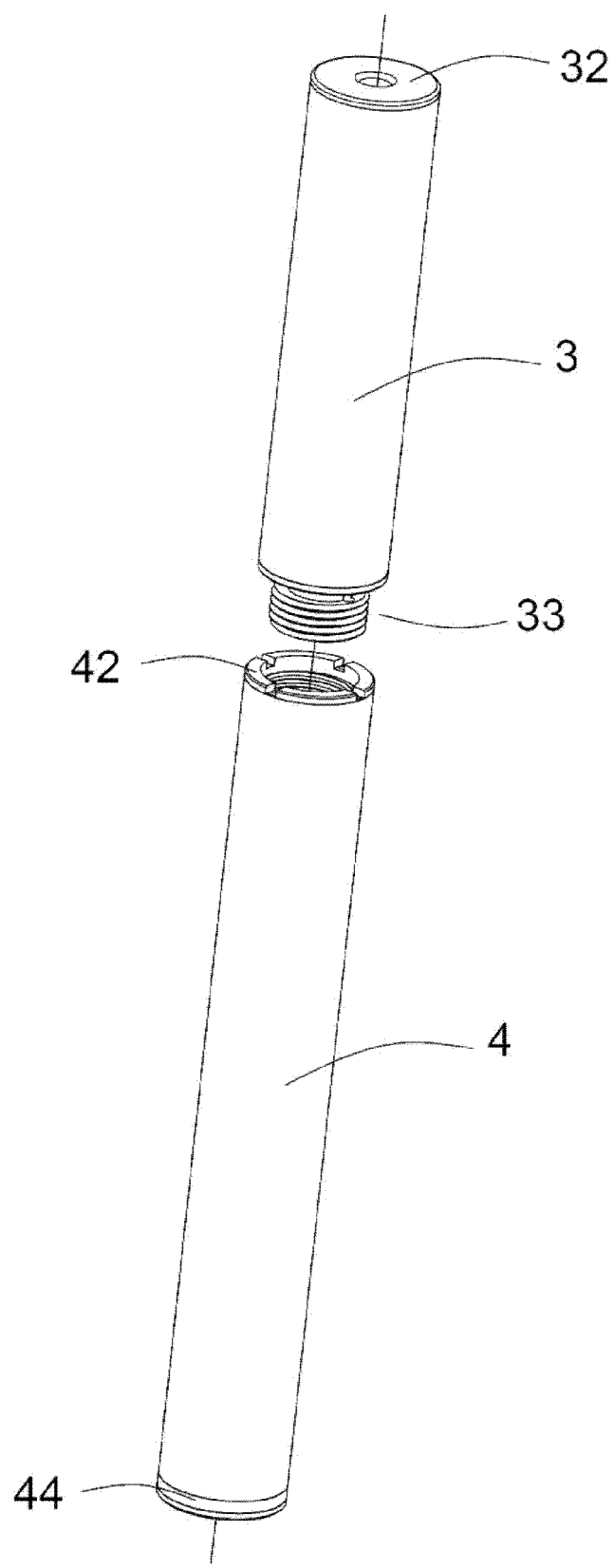
FIG. 8 is an exploded perspective view of an electronic cigarette according to the embodiment of the present invention.
Figure 9:
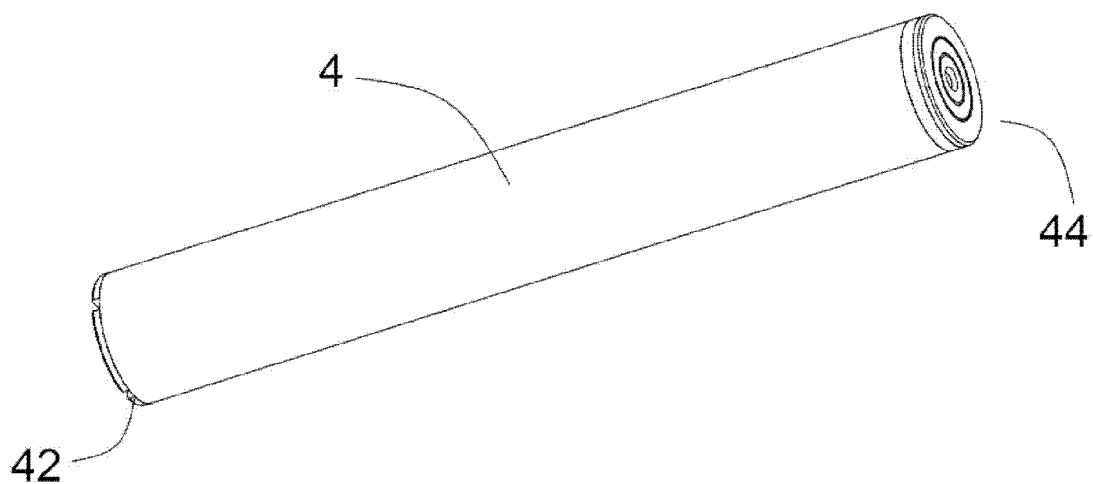
FIG. 9 is an exploded perspective view of a battery rod assembly of the electronic cigarette according to the embodiment of the present invention.
Figure 10:
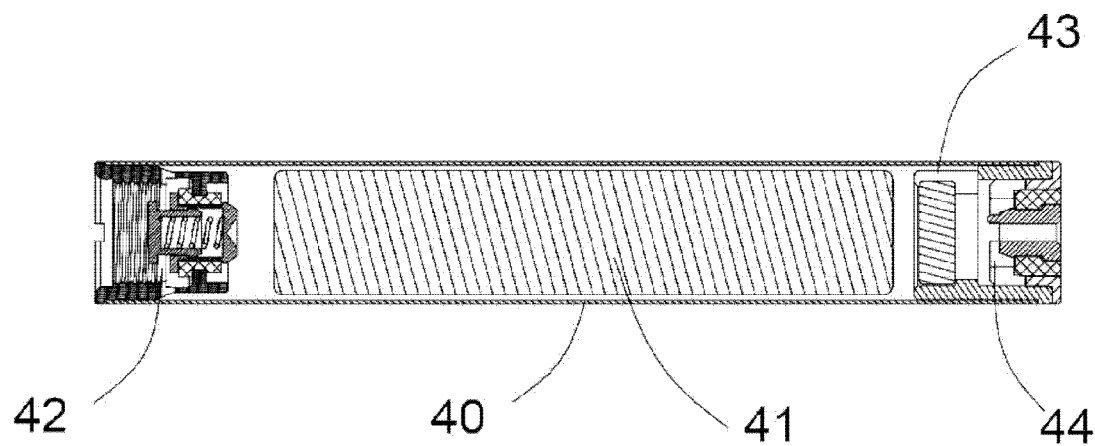
FIG. 10 is a cross-sectional view of a battery rod assembly of the electronic cigarette according to the embodiment of the present invention.
Figure 11:
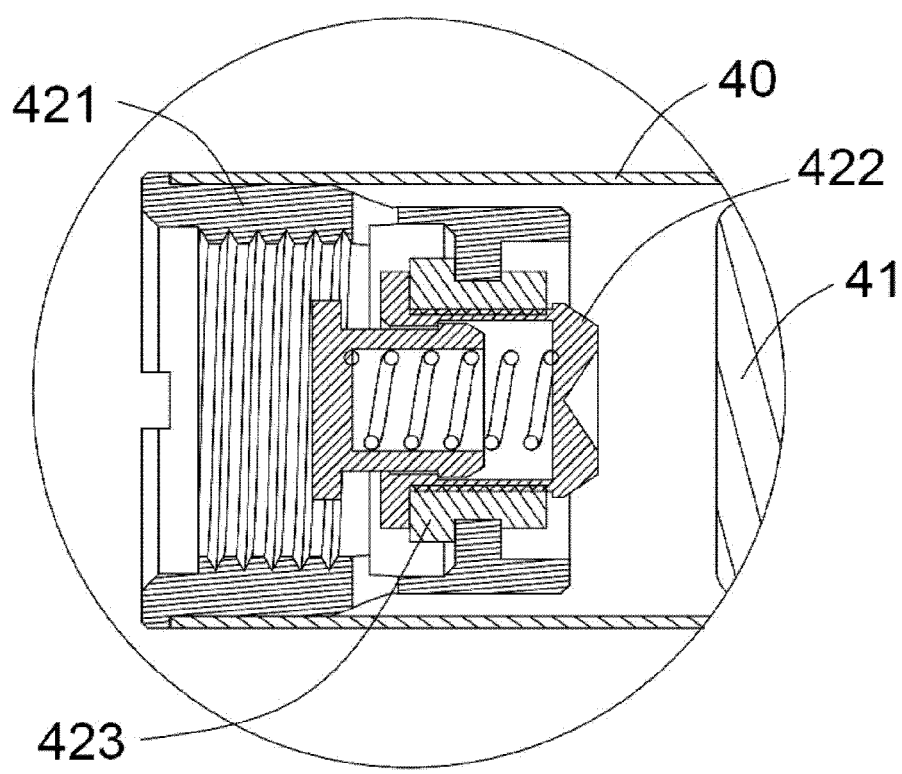
FIG. 11 is a partially enlarged schematic view of the battery rod assembly of the electronic cigarette according to the embodiment of the present invention which is on the left portion of FIG. 10.
Figure 12:
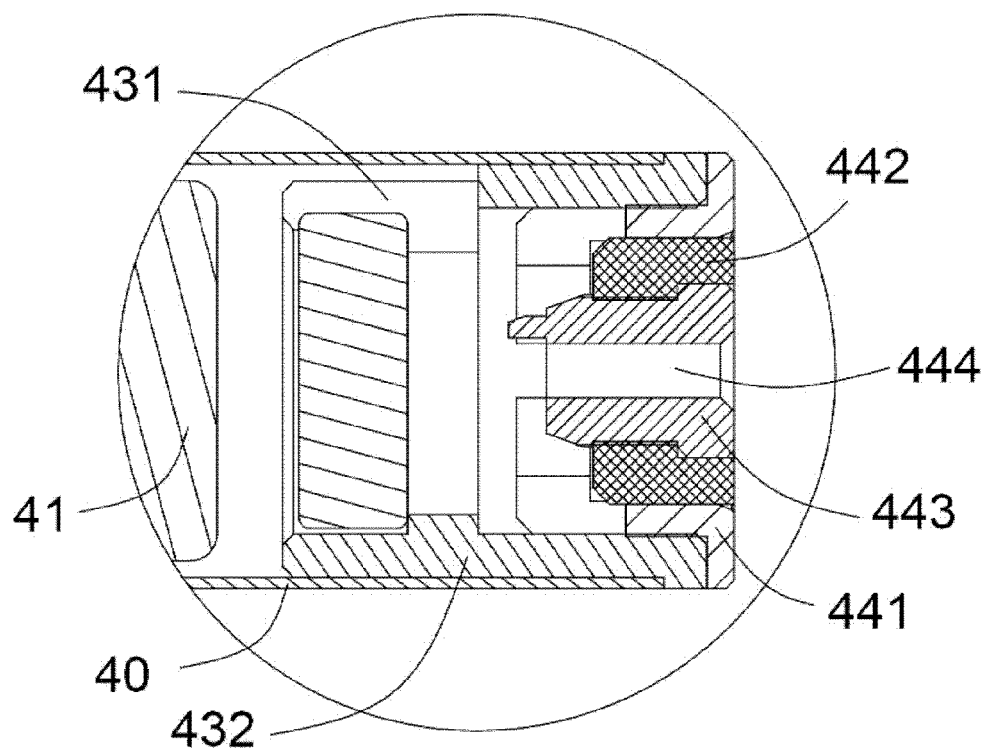
FIG. 12 is a partially enlarged schematic view of the battery rod assembly of the electronic cigarette according to the embodiment of the present invention which is on the right portion of FIG. 10.
Figure 13:
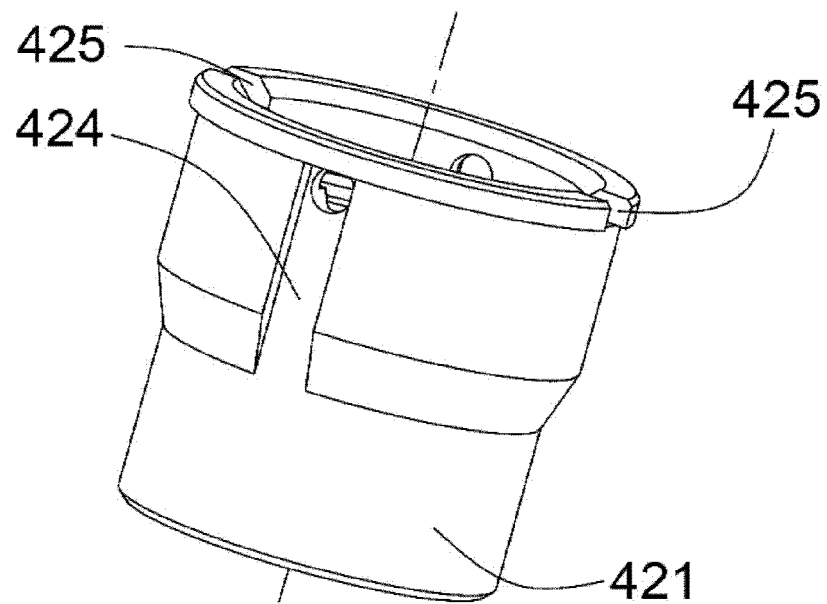
FIG. 13 is a perspective view of a thread sleeve of the electronic cigarette according to the embodiment of the present invention.

As shown in FIG. 1 and FIG. 7 of the drawings, a top portion of the case body 1 is provided with a positioning convex platform 17. When the case cover 2 is closed to the case body 1, the case cover 2 is positioned on the positioning convex platform 17 of the case body 1. According to the embodiment of the present invention, the case body 1 is coupled with the case cover 2 by the positioning convex platform 17, so that the muff-coupling of the case body 1 and the case cover 2 is more firmly and stable when the case cover 2 is closed, and the case cover 2 will not swing after being closed. Thus, the connecting structure of the case body 1 and the case cover 2 is effectively protected.

As shown in FIG. 7 of the drawings, the case body 1 comprises a middle metal shell 101 and an inner cover 102. The circuit assembly 12, the cigarette battery 13 and the magnetic attraction type charging base 14 are provided in the middle metal shell 101, and the jacks 11 are provided on a top portion of the middle metal shell 101. A rear panel 103 is provided in a surface of the middle metal shell 101, and a front panel 104 is provided on a surface of the inner cover 102. The inner cover 102 is provided with a perspective hole 105, and the circuit assembly 12 is provided with a liquid crystal display 121. The liquid crystal display 121 is abutted against an edge of the perspective hole 105 by a foam 122 and the front panel 104 is corresponded to a perspective window 106 of the perspective hole 105. Two case cover panels 201 are respectively provided on two sides of the case cover 2. According to the embodiment of the present invention, there is a content display on the liquid crystal display 121 through the perspective window 106 and the perspective hole 105 and electric energy information of the cigarette battery 13 and an electronic cigarette battery 41 are simultaneously displayed. Furthermore, the foam 122 is able to protect the liquid crystal display 121. In this embodiment of the present invention, bevel edges around openings of the case body 1 and the case cover 2 are disposed by electroforming technology, and opening end surfaces of the case body 1 and the case cover 2 are specular surfaces. The case cover panels 201, the rear panel 103 and the front panel 104 are acrylic boards or leather plates (leather or artificial leather) according to requirements. In addition, if the case cover panels 201, the rear panel 103 and the front panel 104 are made of wood or bamboo, the texture of the case body 1 is heightened and the class and grade of the case body 1 are enhanced. The case cover panels 201, the rear panel 103 and the front panel 104 of the present invention in this embodiment are acrylic boards. According to the embodiment of the present invention, the middle metal shell 101 is made of zinc alloy. In addition, the middle metal shell 101 is also made of aluminum alloy or stainless steel in other embodiments according to requirements. Referring to FIG. 1 and FIG. 7 of the drawings, it is worth mentioning that a top portion of the middle metal shell 101 is provided with three jacks 11, wherein two of the jacks 11 are adapted for receiving the atomizer assembly 3 and one of the jacks 11 is adapted for receiving the electronic cigarettes. Furthermore, the jacks 11 are aligned with the splicing inner hole 142 of the magnetic attraction type charging base 14. In addition, the number of the jacks 11 receiving the atomizer assembly 3 can be changed according to requirements.

Figure 14:
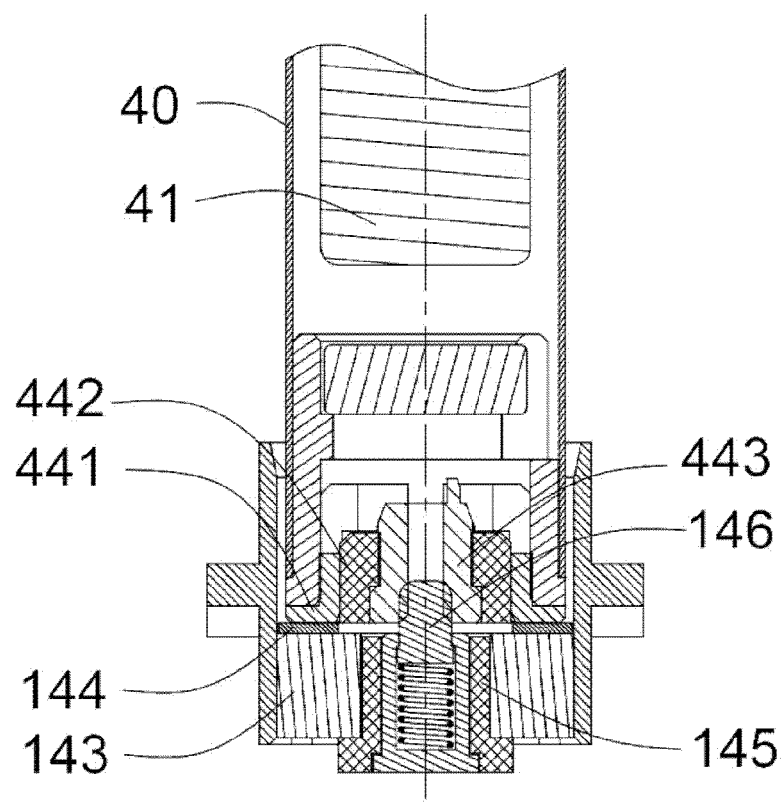
FIG. 14 is a cross-sectional view of a magnetic suction cooperating connection of the electronic cigarette and the magnetic attraction type charging base according to the embodiment of the present invention.
Figure 15:
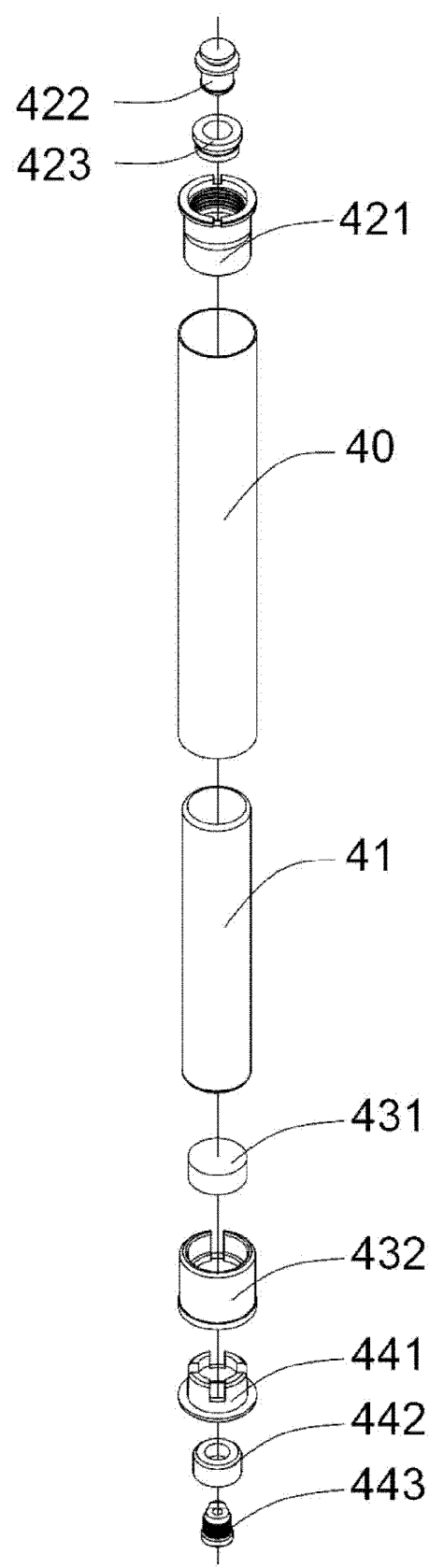
FIG. 15 is an exploded perspective view of the battery rod assembly of the electronic cigarette according to the embodiment of the present invention.
Figure 16:
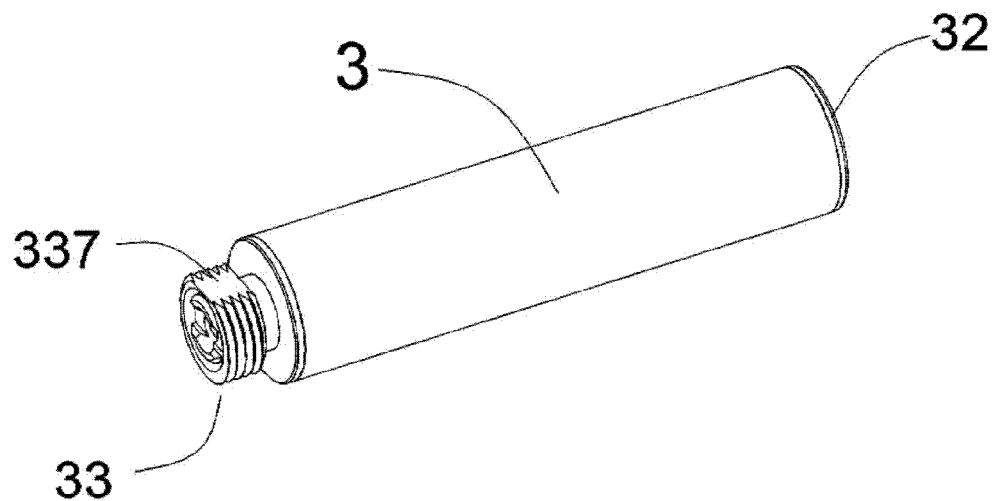
FIG. 16 is a perspective view of an atomizer assembly of the electronic cigarette according to the embodiment of the present invention.
Figure 17:
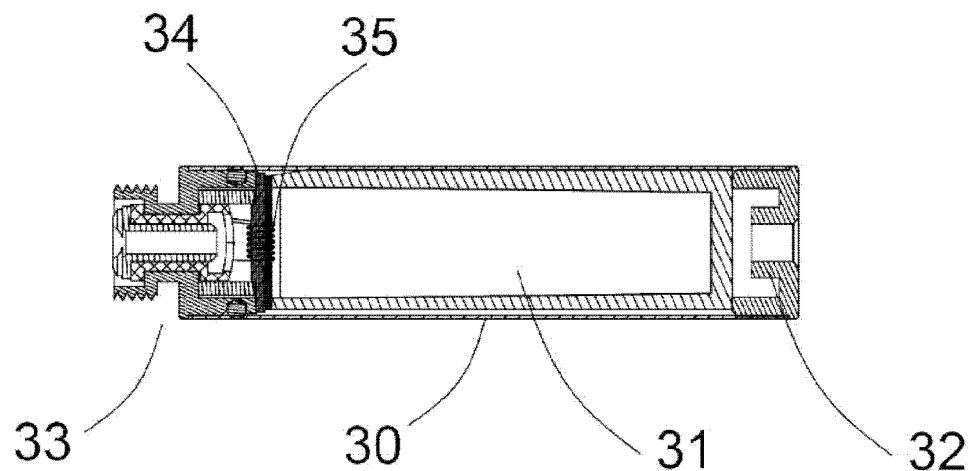
FIG. 17 is a cross-sectional view of the atomizer assembly of the electronic cigarette according to the embodiment of the present invention.
Figure 18:
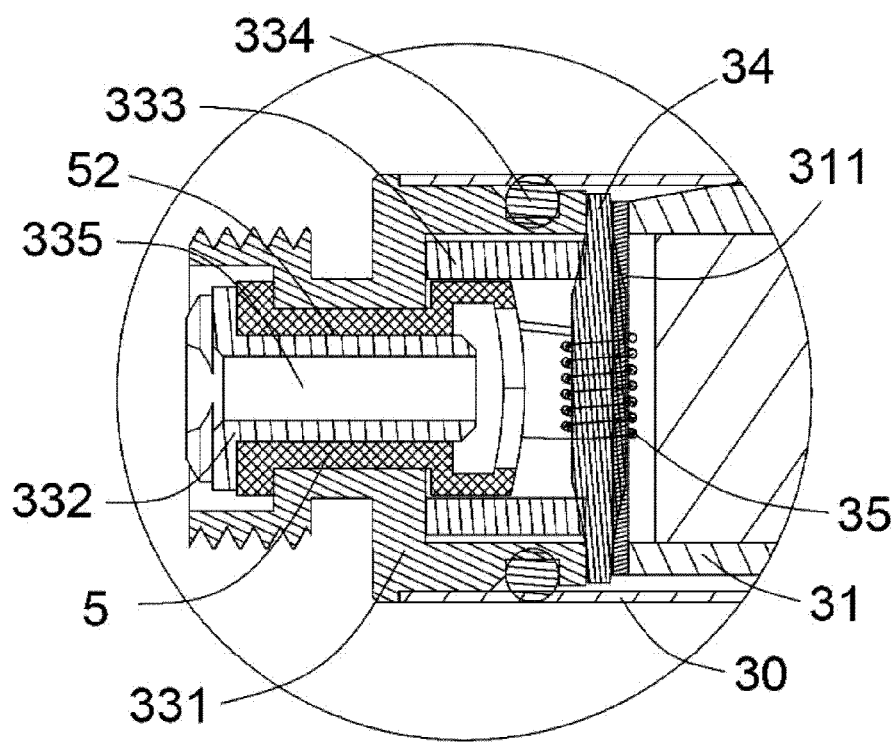
FIG. 18 is a partially enlarged schematic view of the battery rod assembly of the electronic cigarette according to the embodiment of the present invention which is on the left portion of FIG. 15.

Referring to FIG. 8 to FIG. 15 of the drawings, an electronic cigarette with a magnetic attraction type charging function according to the embodiment of the present invention is illustrated, wherein the electronic cigarette comprises an atomizer assembly 3 and a battery rod assembly 4. The battery rod assembly 4 comprises a battery tube 40 internally installed the electronic cigarette battery 41. One end of the battery tube 40 is provided with an atomizer connector 42 and other end of the battery tube 40 is provided with a microphone module 43. The microphone module 43 comprises a light transmitting microphone base 431 and an electronic cigarette microphone 432 provided in the light transmitting microphone base 431. An outer side of the light transmitting microphone base 431 is provided with a magnetic attraction type charging assembly 44. The magnetic attraction type charging assembly 44 comprises an annular iron piece 441. A light transmitting isolation piece 442 is inserted into the annular iron piece 441 and a power supply ejector pin 443 is inserted into the light transmitting isolation piece 442. The power supply ejector pin 443, the annular iron piece 441 and the electronic cigarette battery 41 are respectively connected to the electronic cigarette microphone 432. According to the embodiment of the present invention, an outer side of the light transmitting microphone base 431 is provided with the magnetic attraction type charging assembly 44. When the electronic cigarette is not in use and if the electronic cigarette is out of power, the atomizer assembly 3 and the battery rod assembly 4 cannot be detached, wherein the electronic cigarette is just needed to be inserted into the electronic cigarette case and the magnetic attraction type charging assembly 44 is electrically contacted to the electrodes of the electronic cigarette case so as to be convenient to use. Furthermore, as the magnetic attraction type charging assembly 44 comprises the annular iron piece 441, and that the light transmitting isolation piece 442 is inserted into the annular iron piece 441 and the power supply ejector pin 443 is inserted into the light transmitting isolation piece 442, the power supply ejector pin 443, the annular iron piece 441 and the electronic cigarette battery 41 are respectively connected to the electronic cigarette microphone 432. The annular iron piece 441 is an electrode and also is a magnetic attraction member, which greatly simplifies the structure of the magnetic attraction type charging assembly 44 and ensures that the annular iron piece 441 has a larger contacting area to enhance the stability of electrical connections. Moreover, the light transmitting isolation piece 442 is inserted into the annular iron piece 441, so that, under a condition that the electronic cigarette microphone 432 is pervious to light, firmly and stable connections of the electrodes of the electronic cigarette case are ensured and the electronic cigarette case has the advantages of stable and reliable charging connections, convenience and quickness in use and a simple structure. When the electronic cigarette in the embodiment is cooperated with the magnetic attraction type charging base 14 to charge, the electronic cigarette is inserted into the jacks 11 so as to have a magnetic attraction type connection between the magnetic attraction type charging assembly 44 and the magnetic attraction type charging base 14. At this time, when the case cover 2 is closed and the vibrating piece 22 is firmly pressed on the electronic cigarette inserted into the jacks 11, a stable and reliable electrical connection of the magnetic attraction type charging assembly 44 and the magnetic attraction type charging base 14 is further ensured. As shown in FIG. 14 of the drawings, when the magnetic attraction type charging assembly 44 and the magnetic attraction type charging base 14 have the magnetic attraction type connection, the annular magnet 143 of the magnetic attraction type charging base 14 attracts the annular iron piece 441 of the magnetic attraction type charging assembly 44 so as to electrically conduct the annular iron piece 441 and the copper sheet 144, while the power supply ejector pin 443 is abutted against the elastic charging ejector pin 146 so as to electrically conduct the elastic charging ejector pin 146.

As shown in FIG. 16, FIG. 17, FIG. 18 and FIG. 20 of the drawings, the atomizer assembly 3 comprises an atomizing tube 30 built-in an oil bullet 31. One end of the atomizing tube 30 is provided with a cigarette holder 32 and other end of the atomizing tube 30 is provided with a battery rod connector 33. The battery rod connector 33 comprises a metal screw rod 331 and an atomizer thimble 332. An anti-oil-leakage insulated isolation element 5 is provided between the metal screw rod 331 and the atomizer thimble 332. A ceramic base 333 is provided in the metal screw rod 331 and a sealing loop 334 is provided between the metal screw rod 331 and the atomizing tube 30. An opening of the oil bullet 31 is sealed with a filter cotton 311 and an oil guiding rope 34 is clamped and fastened between the metal screw rod 331 and the ceramic base 333. The oil guiding rope 34 is surrounded with a heating wire 35. The metal screw rod 331 and the atomizer thimble 332 are respectively connected with the heating wire 35. The atomizer connector 42 comprises a metal thread sleeve 421 and an elastic battery thimble 422. A thimble insulated isolation element 423 is provided between the metal thread sleeve 421 and the elastic battery thimble 422. The metal thread sleeve 421 is inserted into the battery tube 40. The metal thread sleeve 421 and the metal screw rod 331 are electrically connected by threaded fit, and the elastic battery thimble 422 and the atomizer thimble 332 are electrically connected by contacting to each other. The atomizer assembly 3, according to the embodiment of the present invention, comprises the atomizing tube 30, the oil bullet 31, the cigarette holder 32, and the battery rod connector 33. The ceramic base 333 is provided in the metal screw rod 331 and the sealing loop 334 is provided between the metal screw rod 331 and the atomizing tube 30. The opening of the oil bullet 31 is sealed with the filter cotton 311. The oil guiding rope 34 is sandwiched and fixed between the filter cotton 311 and the ceramic base 333. The oil guiding rope 34 is surrounded with the heating wire 35. Based on the above configuration, the structure of the atomizer assembly 3 is simplified, the production efficiency of the atomizer assembly 3 is heightened, and the production cost of the atomizer assembly 3 is reduced. Meanwhile, the battery rod connector 33 comprises the metal screw rod 331 and the atomizer thimble 332, the atomizer connector 42 comprises the metal thread sleeve 421 and the elastic battery thimble 422, wherein the metal thread sleeve 421 and the metal screw rod 331 are threaded fitted, so that the atomizer assembly 3 and the battery rod assembly 4 have a stable electrical connection.

According to the embodiment of the present invention, the heating wire 35 is implied as a titanium alloy heating wire which is also called a titanium heating wire. The titanium alloy heating wire replaces a nickel alloy wire which is commonly used in the conventional electronic cigarette and has a toxic risk. Furthermore, like the titanium metal, the titanium alloy heating wire has the characteristics of human friendly, compatibility of human body and safe non-toxic. The titanium alloy heating wire used in the embodiment of the present invention is specifically produced by Shenzhen Honestel Technology Co., Ltd.

Figure 19:
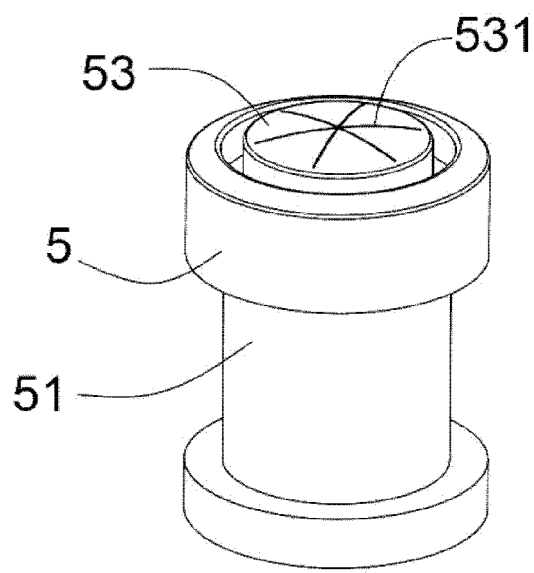
FIG. 19 is a perspective view of an anti-oil-leakage insulated isolation element of the electronic cigarette according to the embodiment of the present invention.
Figure 20:
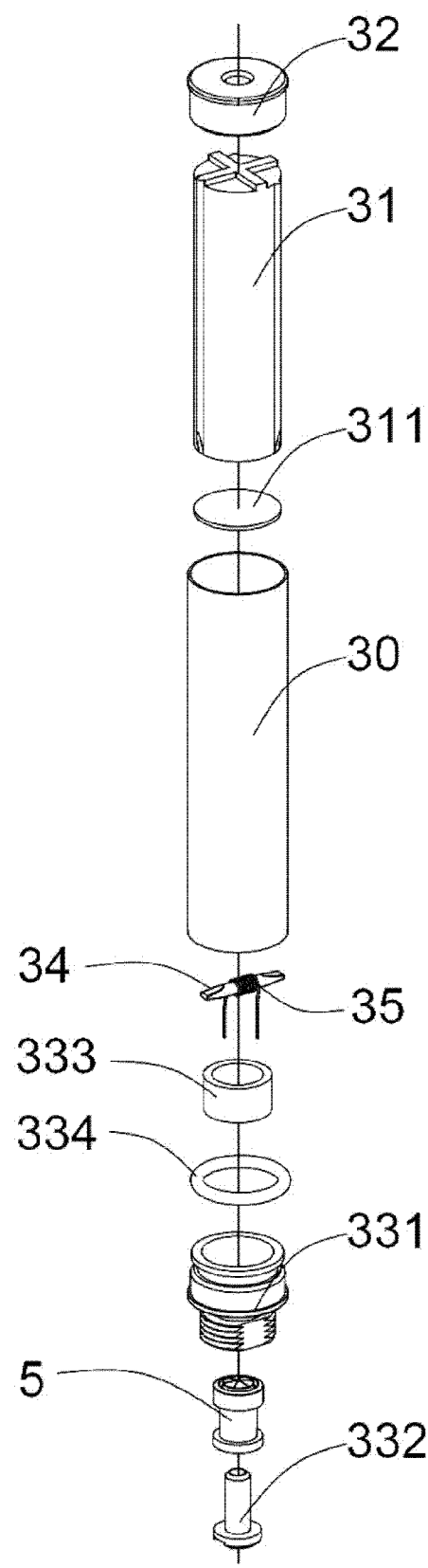
FIG. 20 is an exploded perspective view of the atomizer assembly of the electronic cigarette according to the embodiment of the present invention.

As shown in FIG. 19 and FIG. 20 of the drawings, an outer wall of the anti-oil-leakage insulated isolation element 5 is provided with a mounting groove 51 and the anti-oil-leakage insulated isolation element 5 is inserted and positioned into the metal screw rod 331 by the mounting groove 51. An oil isolation film 53 is provided on the anti-oil-leakage insulated isolation element 5 and is located on a side of the venthole 52. A plurality of ventilate oil isolation slits 531 is radially and centrosymmetric arranged on the oil isolation film 53. When there is air flowing through, the air pressure is applied on the ventilate oil isolation slit 531 to open the ventilate oil isolation slit 531 and the air flow through the ventilate oil isolation slit 531. When there is no air flowing through, the oil isolation film 53 returns its original position, so that the ventilate oil isolation slit 531 is closed to obstruct the tobacco tar outside and, under a ventilating condition, an oil leakage problem which is commonly existed in conventional atomizer assembly is effectively solved. In addition, the anti-oil-leakage insulated isolation element 5 according to the embodiment of the present invention has advantages of a simple structure and a low cost.

Figure 21:
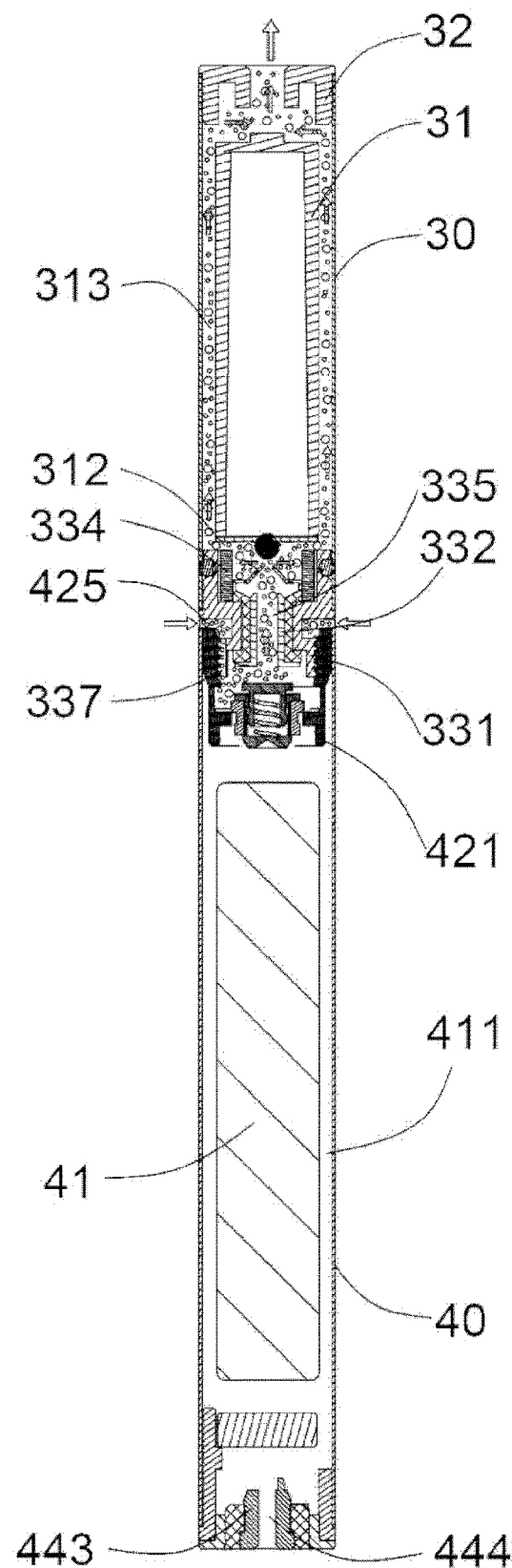
FIG. 21 is a schematic diagram of the electronic cigarette according to the embodiment of the present invention, illustrating a flow direction of a first set of airflow when the electronic cigarette is in use.
Figure 22:
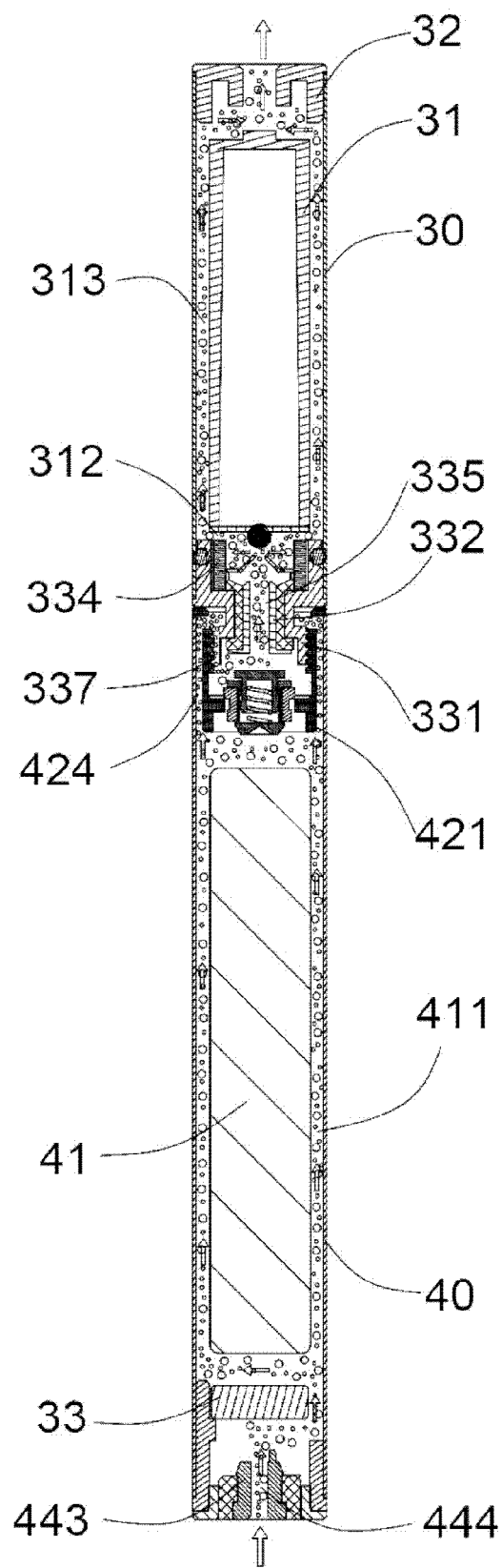
FIG. 22 is a schematic diagram of the electronic cigarette according to the embodiment of the present invention, illustrating a flow direction of a second set of airflow when the electronic cigarette is in use.

As shown in FIG. 21 and FIG. 22 of the drawings, the atomizer thimble 332 is provided with a first inner hole 335 and an outer wall of the gap teeth 337 is provided with gap teeth 337. An outer wall of the metal thread sleeve 421 is provided with a gas guiding groove 424 and a first overall air inlet 425. The power supply ejector pin 443 is provided with a second overall air inlet 444 and an inner chamber of the ceramic base 333 is communicated with the second overall air inlet 444 sequentially by the first inner hole 335, the gap teeth 337, the gas guiding groove 424, a first gap 411, and the microphone module 43. The first gap 411 is provided between the battery tube 40 and the electronic cigarette battery 41. Meanwhile, an inner chamber of the ceramic base 333 is communicated with the cigarette holder 32 sequentially by a second gap 312 and a third gap 313. The second gap 312 is provided between the ceramic base 333 and the oil bullet 31, and the third gap 313 is provided between the oil bullet 31 and the atomizing tube 30. As the electronic cigarette in the embodiment comprises the first overall air inlet 425 and the second overall air inlet 444 and when the electronic cigarette is in use, two sets of air-flows are formed in the first overall air inlet 425 and the second overall air inlet 444, so that enough air inflow is ensured when the electronic cigarette is in use. As shown in FIG. 21 of the drawings, a first set of air-flow is respectively entered through two first overall air inlet 425 and then sequentially flow through the gap teeth 337 and the first inner hole 335 so as to enter the inner chamber of the ceramic base 333 which is an atomizer chamber. Meanwhile, the second set of air-flow is entered through the second overall air inlet 444 and sequentially flow through the 43, the first gap 411, the gas guiding groove 424, the gap teeth 337, and the first inner hole 335, so as to enter the inner chamber of the ceramic base 333 which is an atomizer chamber. Two sets of air-flows are confluent in the inner chamber of the ceramic base 333 which is an atomizer chamber and carry the atomized tobacco tar to enter smoker's mouth passed through the second gap 312, the third gap 313 and the cigarette holder 32.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electronic cigarette case with magnetic attraction type charging function, comprising:
   a case body provided with one or more jacks, and
   a case cover, wherein said case body comprises a circuit assembly, a cigarette battery and a magnetic attraction type charging base which comprises a charging base body disposed inside said case body, wherein said charging base body is provided with a splicing inner hole aligned with said jacks, wherein an annular magnet is provided in said splicing inner hole and a sheet having an inner hole is inserted into said splicing inner hole of said magnetic attraction type charging base, wherein said sheet is arranged on outside of said annular magnet and an insulating ejector pin base is inserted into said annular magnet, wherein an elastic charging ejector pin is inserted into said insulating ejector pin base, and said elastic charging ejector pin, wherein said copper sheet and said cigarette battery are respectively connected with said circuit assembly, wherein an outer wall of said charging base body is provided with a sliding slot which is arranged parallel to an axial direction of said charging base body, and one side of said copper sheet is provided with a positioning strip which is slidably provided in said sliding slot, wherein said case cover is provided with two parallel connecting panels and a spring base is provided on said case body, said spring base being provided with a metal sheet which is provided with a rotate resetting spring, an upper portion of said metal sheet being movable connected to said two connecting panels by a connecting shaft, one end portion of said rotate resetting spring being abutted against lower end portions of said two connecting panels and other end portion of said rotate resetting spring being abutted against an upper end portion of said spring base, an outside of said metal sheet being provided with a rotate positioning groove cooperated with a rotating axle to achieve a reversal positioning, said rotating axle being provided on said connecting panels and disposed on an upper side of said connecting shaft, one end portion of said rotating axle being provided with an axle cap, and said rotating axle penetrating through said two connecting panels in sequence and being fixed to said connecting panels by a screw, wherein a vibrating piece is provided in said case cover, one end of said vibrating piece being connected with an inner wall of said case cover by a connector, said vibrating piece being provided with a sound hammer and said sound hammer is being on a side which is said vibrating piece facing to the inner wall of said case cover, said sound hammer being spaced with the inner wall of said case cover.

2. The electronic cigarette case, as recited in claim 1, wherein a top portion of said case body is provided with a positioning convex platform, and when said case cover is closed to said case body, said case cover is positioned on said positioning convex platform of said case body.

3. The electronic cigarette case, as recited in claim 2, wherein said case body comprises a middle metal shell and an inner cover, wherein said circuit assembly, said cigarette battery and said magnetic attraction type charging base are provided in said middle metal shell, wherein a top portion of said middle metal shell is provided with said jacks, wherein a rear panel is provided in a surface of said middle metal shell, wherein a front panel is provided on a surface of said inner cover and said inner cover is provided with a perspective hole, wherein said circuit assembly is provided a liquid crystal display abutted against an edge of said perspective hole by a foam, wherein said front panel is corresponded to a perspective window of said perspective hole, wherein two case cover panels are respectively provided on two sides of said case cover, and said case cover panels, said rear panel and said front panel are made of materials selected from said group consisting of acrylic and leather.

\* \* \* \* \*